United States Patent
Singal et al.

(10) Patent No.: US 11,593,287 B2
(45) Date of Patent: *Feb. 28, 2023

(54) PORT CONFIGURATION MIGRATION SYSTEM

(71) Applicant: Dell Products L.P., Round Rock, TX (US)

(72) Inventors: Pawan Kumar Singal, Milpitas, CA (US); Balaji Rajagopalan, Sunnyvale, CA (US); Ning Zhuang, San Jose, CA (US); Joyas Joseph, San Jose, CA (US); Joseph Lasalle White, San Jose, CA (US)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/506,014

(22) Filed: Oct. 20, 2021

(65) Prior Publication Data

US 2022/0035756 A1 Feb. 3, 2022

Related U.S. Application Data

(63) Continuation of application No. 16/946,907, filed on Jul. 10, 2020, now Pat. No. 11,163,709.

(51) Int. Cl.
*G06F 13/20* (2006.01)
*H04L 69/324* (2022.01)
*H04L 12/46* (2006.01)
*G06F 13/40* (2006.01)

(52) U.S. Cl.
CPC .......... *G06F 13/20* (2013.01); *G06F 13/4027* (2013.01); *H04L 12/4641* (2013.01); *H04L 69/324* (2013.01)

(58) Field of Classification Search
CPC ... G06F 13/20; G06F 13/4027; H04L 63/324; H04L 12/4641
See application file for complete search history.

(56) References Cited

U.S. PATENT DOCUMENTS 7,447,149 B1 * 11/2008 Beesley ................. H04L 45/22
370/225
9,154,330 B2 10/2015 Hu
9,354,905 B2 5/2016 Nakagawa
(Continued)

*Primary Examiner* — Glenn A. Auve
(74) *Attorney, Agent, or Firm* — Joseph Mencher

(57) ABSTRACT

A port configuration migration system includes a primary I/O module connected to a server device via a secondary I/O module. A fabric manager system maps a virtual interface to a first downlink port on the primary I/O module that is connected to the secondary I/O module, with the virtual interface providing a virtual direct connection to the server device. The fabric manager system then configures the virtual interface with communication configuration information for the server device such that communications received via the first downlink port are transmitted using the virtual interface. The fabric manager system then receives a discovery communication from the server device via a second downlink port on the primary I/O module that is connected to the secondary I/O module, and remaps the virtual interface to the second downlink port such that communications received via the second downlink port are transmitted using the virtual interface.

20 Claims, 9 Drawing Sheets

(56) References Cited

U.S. PATENT DOCUMENTS

| | | | |
|---|---|---|---|
| 9,461,840 B2 | 10/2016 | Chatwani et al. | |
| 11,163,709 B1 * | 11/2021 | Singal | G06F 13/4027 |
| 2015/0222509 A1 | 8/2015 | Hyoudou et al. | |
| 2015/0355934 A1 | 12/2015 | Yin et al. | |
| 2018/0189152 A1 | 7/2018 | B S et al. | |
| 2018/0241632 A1 | 8/2018 | Shetty et al. | |

* cited by examiner

PORT CONFIGURATION MIGRATION SYSTEM

CROSS-REFERENCE TO RELATED APPLICATIONS

The present disclosure is a continuation of U.S. patent application Ser. No. 16/946,907, filed on Jul. 10, 2020, the disclosure of which is incorporated by reference herein in its entirety.

BACKGROUND

The present disclosure relates generally to information handling systems, and more particularly to migrating port configuration information for ports on information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices, may be connected to each other and/or a network via Input/Output (I/O) modules in order to transmit communications between each other and/or via the network. For example, primary I/O modules may be connected via secondary I/O modules to server devices, and may be connected to each other and/or a network via switch devices (e.g., leaf and spine switch devices) as well. As will be appreciated by one of skill in the art in possession of the present disclosure, the physical I/O module configuration discussed above may allow a first server device connected via a first secondary I/O module to a first primary I/O module to communicate through the Internet via an Internet device connected to a switch device, or with a second server device connected via a second secondary I/O module to a second primary I/O module via a switch device(s). However, the primary I/O module/secondary I/O module configurations discussed above can raise some issues.

For example, the secondary I/O modules may be connected via their secondary I/O module uplink ports to primary I/O module downlink ports on the primary I/O modules, and the primary I/O modules may be provided server device communication information that allows the primary I/O modules to transmit server device communications received via those secondary I/O modules from any server device. However, in conventional systems, the configuration information to allow the transmission of server device communications received from any particular server device is "tied" to the secondary I/O module connected to that server device such that, when the connections from that secondary I/O module to a primary I/O module changes (e.g., cabling from that secondary I/O module is connected to different primary I/O module downlink ports), the primary I/O module to which the secondary I/O module was connected must be reconfigured in order to be able to transmit communications received from the server devices via the new connections, requiring a user or other network administrator to reconfigure the primary I/O module and resulting in system downtime.

Accordingly, it would be desirable to provide a port configuration system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a fabric management engine that is configured to: map a virtual interface to a first primary I/O module downlink port on a primary I/O module that is connected to a first secondary I/O module uplink port on a secondary I/O module, wherein the virtual interface provides a virtual direct connection of the virtual interface to a server device that is connected to the secondary I/O module; configure the virtual interface with server device communication configuration information for the server device such that data communications received via the first primary I/O module downlink port are transmitted using the virtual interface configured with the server device communication configuration information for the server device; receive, via a second primary I/O module downlink port on the primary I/O module that is connected to a second secondary I/O module uplink port on the secondary I/O module, a discovery communication from the server device; and remap, based on the receiving of the discovery communication via the second primary I/O module downlink port on the secondary I/O module from the server device, the virtual interface to the second primary I/O module downlink port such that data communications received via the second primary I/O module downlink port are transmitted using the virtual interface configured with the server device communication configuration information for the server device.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
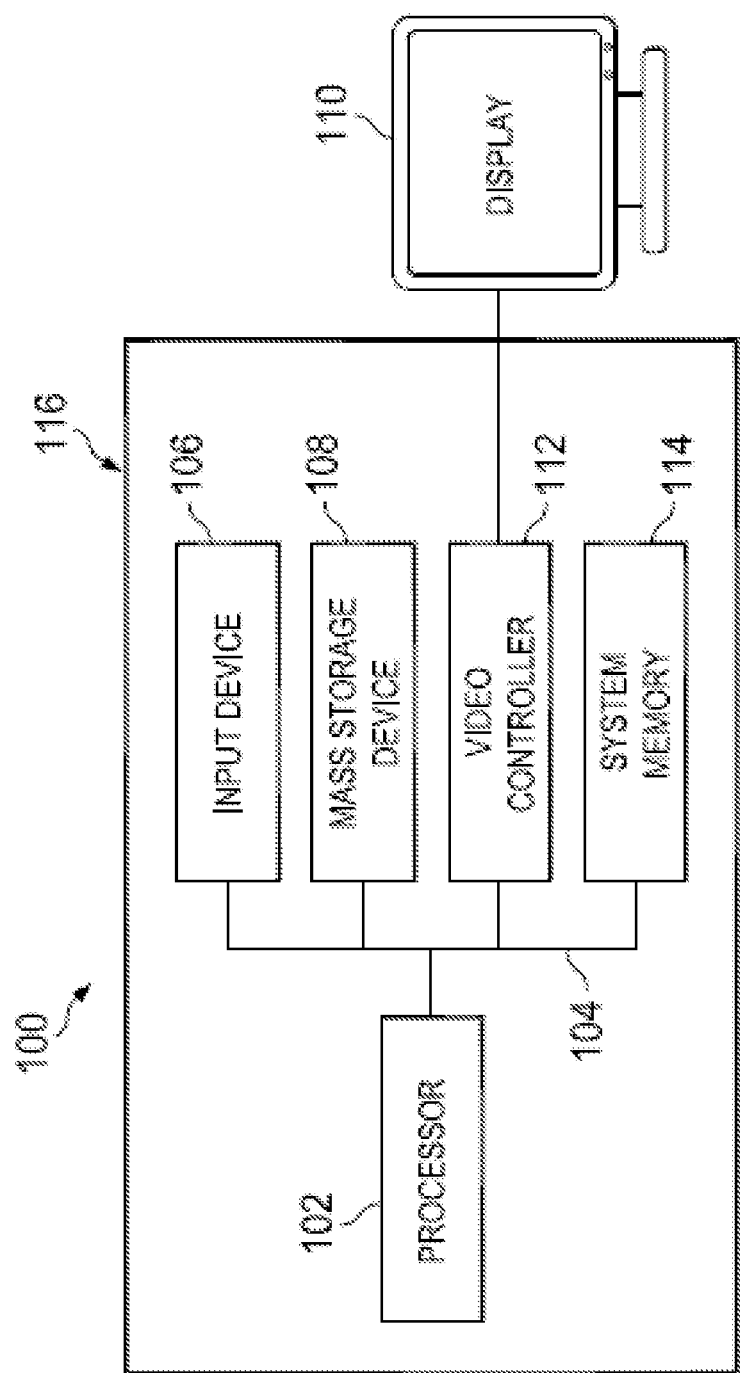
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
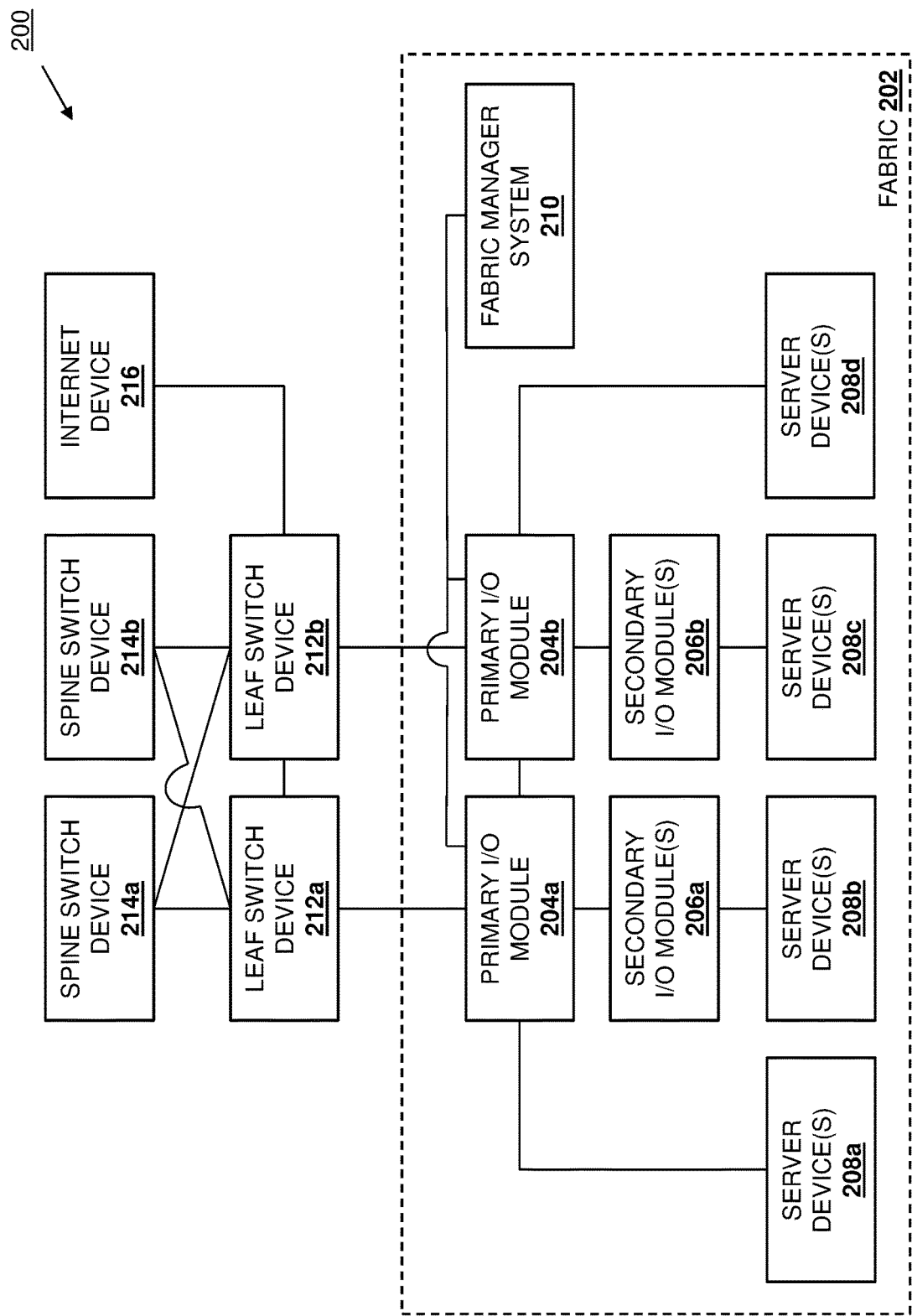
FIG. 2 is a schematic view illustrating an embodiment of a port configuration migration system.

Referring now to FIG. 2, an embodiment of a port configuration migration system 200 is illustrated. In the illustrated embodiment, the port configuration migration system 200 includes a fabric 202 having a plurality of primary Input/Output (I/O) modules 204a and 204b. However, while only two primary I/O modules are illustrated and discussed below, one of skill in the art in possession of the present disclosure will appreciate that that port configuration migration system 200 may include more or fewer primary I/O modules while remaining within the scope of the present disclosure as well. In an embodiment, either or both of the primary I/O modules 204a and 204b may be provided by the IHS 100 discussed above with reference to FIG. 1, and/or may include some or all of the components of the IHS 100. In a specific example, either or both of the primary I/O modules 204a and 204b may be provided by a DELL® EMC® networking MX9116n fabric switching engine switch device, available from DELL® Inc. of Round Rock, Tex., United States. One of skill in the art in possession of the present disclosure will appreciate that the primary I/O modules 204a and 204b may be provided by "full-function" I/O modules that include an operating system and that may be configured to perform any of a variety of I/O module functions known in the art in handling server device communications, discussed in further detail below, and in specific examples may include networking hardware providing networking functions capable of supporting the secondary I/O modules discussed below that are coupled to them via double-density connections. However, while illustrated and discussed as being provided by particular type/functionality I/O modules, one of skill in the art in possession of the present disclosure will recognize that the port configuration migration system 200 may include any devices that may be configured to operate similarly as the primary I/O modules 204a and 204b discussed below.

In the illustrated embodiment, the fabric 202 in the port configuration migration system 200 also includes one or more secondary I/O modules 206a coupled to the primary I/O module 204a, and one or more secondary I/O modules 206b coupled to the primary I/O module 204b. For example, each secondary I/O module may be coupled to one of the primary I/O modules 204a and 204b via an aggregated link (e.g., a VLT port channel in the VLT protocol), and one of skill in the art in possession of the present disclosure will appreciate that each primary I/O module 204a and 204b may typically be coupled to between 1-9 secondary I/O modules, while being capable of coupling to up to 12 secondary I/O modules. In an embodiment, any or all of the secondary I/O modules 206a-206b may be provided by the IHS 100 discussed above with reference to FIG. 1, and/or may include some or all of the components of the IHS 100. In a specific example, any or all of the secondary I/O modules 206a-206b may be provided by a DELL® MX7108 expander module, available from DELL® Inc. of Round Rock, Tex., United States.

One of skill in the art in possession of the present disclosure will appreciate that the secondary I/O modules 206a-206b may be provided to enable their connected primary I/O module to couple to additional server devices (discussed in further detail below) and, as such, may not include an operating system, and may not be configured to perform many (or all of) the variety of I/O module functions performed by the primary I/O modules 204a and 204b, discussed in further detail below, and in specific examples may and electrical pass-through device connected via double-density connections to the primary I/O modules discussed above. However, while illustrated and discussed as being provided by particular type/functionality I/O modules, one of skill in the art in possession of the present disclosure will recognize that the port configuration migration system 200 may include any devices that may be configured to operate similarly as the secondary I/O modules 206a-206b discussed below.

In the illustrated embodiment, the fabric 202 in the port configuration migration system 200 also includes one or more server devices 208a coupled to the primary I/O module 204a, one or more server devices 208b coupled to one or more of the secondary I/O modules 206a, one or more server devices 208c coupled to one or more of the secondary I/O modules 206b, and one or more server devices 208d coupled to the primary I/O module 204b. In an embodiment, any or all of the server devices 208a-208d may be provided by the IHS 100 discussed above with reference to FIG. 1, and/or may include some or all of the components of the IHS 100. However, while illustrated and discussed as being provided by server devices, one of skill in the art in possession of the present disclosure will recognize that the port configuration migration system 200 may include any devices that may be configured to operate similarly as the server devices 208a-208d discussed below.

As will be appreciated by one of skill in the art in possession of the present disclosure, in a specific example, pairs of the primary I/O modules (e.g., the pair of primary I/O modules 204a/204b) may be provided in a respective rack chassis (e.g., a "primary I/O module rack chassis") such that each primary I/O module rack chassis houses two primary I/O modules. Furthermore, each primary I/O module rack chassis that houses a pair of primary I/O modules may also house server devices that are directly connected to those primary I/O modules (e.g., the server devices 208a and 208d directly connected to the primary I/O modules 204a and 204b, respectively. However, one of skill in the art in possession of the present disclosure will recognize that each primary I/O module rack chassis may be limited to housing a maximum number of server devices (e.g., 8 server devices in many conventional rack chassis), while each of the primary I/O modules may be configured to handle communications from many more server devices.

Furthermore, each secondary I/O module may be provided in a respective rack chassis (e.g., a "secondary I/O module rack chassis") with the server devices 208b-208c (e.g., 8 server devices in each rack chassis) that are connected to that secondary I/O module, and each secondary I/O module is connected to one of the primary I/O modules (which is housed in primary I/O module rack chassis) in order to couple the server devices in its secondary I/O module rack chassis to a primary I/O module. As discussed above, the primary I/O module may be a "full-function" I/O module that includes an operating system and that may be configured to perform a variety of I/O module functions for any server device (e.g., that is directly connected to that primary I/O module, or that is coupled to that primary I/O module by a secondary I/O module), while the secondary I/O modules do not include an operating system and are not configured to perform many (or all) of the variety of I/O module functions, as the purpose of the secondary I/O modules is to simply connect primary I/O modules to additional server devices that are not located in its primary I/O module rack chassis.

In the illustrated embodiment, the fabric 202 in the port configuration migration system 200 also includes a fabric management system 210 that, as illustrated in FIG. 2, may be coupled to each of the primary I/O modules 204a and 204b. In an embodiment, the fabric management system 210 may be provided by the IHS 100 discussed above with reference to FIG. 1, and/or may include some or all of the components of the IHS 100. In a specific example, the fabric management system 210 may be provided by a Smart Fabric Services (SFS) fabric manager system available in operating systems (e.g., the next generation Operating System 10 (0510) provided by DELL® Inc. of Round Rock, Tex., United States), and may be configured to perform a variety of fabric management operations for the primary I/O modules 204a and 204b, the secondary I/O modules 206a-206d, and/or the server devices 208a-208d in the fabric 202, which may provide an SFS domain of the SFS management system. As will be appreciated by one of skill in the art in possession of the present disclosure, the while illustrated and discussed below as being provided separately from the primary I/O modules 204a and 204b, the fabric manager system 210 may be provided by either of the primary I/O modules 204a and 204b (e.g., as part of the operating system in that primary I/O module), or in a different primary I/O module, while remaining within the scope of the present disclosure as well. Furthermore, while illustrated and discussed as being provided by a particular fabric manager system, one of skill in the art in possession of the present disclosure will recognize that the port configuration migration system 200 may include any devices that may be configured to operate similarly as the fabric manager system 210 discussed below.

In the illustrated embodiment, the port configuration migration system 200 also includes a plurality of leaf switch devices 212a and 212b. In an embodiment, either or both of the leaf switch devices 212a and 212b may be provided by the IHS 100 discussed above with reference to FIG. 1, and/or may include some or all of the components of the IHS 100, and in specific examples may be provided by Top Of Rack (TOR) switch devices. However, while illustrated and discussed as being provided by TOR switch devices, one of skill in the art in possession of the present disclosure will recognize that the port configuration migration system 200 may include any devices that may be configured to operate similarly as the leaf switch devices 212a and 212b discussed below. In the illustrated embodiment, pairs of leaf switch devices (e.g., the leaf switch devices 212a/212b) may be coupled together by inter-switch links that may be provided by aggregated Inter-Chassis Links (ICLs) (also referred to as VLT interconnects (VLTi's) in the VLT protocol), and/or other inter-switch connections that would be apparent to one of skill in the art in possession of the present disclosure.

In some embodiments, the leaf switch device 212a may be coupled to each of the primary I/O modules 204a and 204b, and the leaf switch device 212b may be coupled to each of the primary I/O modules 204a and 204b, and one of skill in the art in possession of the present disclosure will recognize that the connections between the leaf switch devices 212a/212b and the primary I/O modules 204a/204b may be aggregated using, for example, the Virtual Link Trunking (VLT) protocol available in switch devices provided by DELL® Inc. of Round Rock, Tex., United States, in order to provide an aggregated link (or "VLT port channel") between the leaf switch devices 216a/216b and the primary I/O modules 204a/204b. In the illustrated embodiment, the port configuration migration system 200 also includes a pair of spine switch devices 214a and 212b, with the spine switch device 214a coupled to each of the leaf switch devices 212a and 212b, and the spine switch device 214b coupled to each of the leaf switch devices 212a and 216b as well. As will be appreciated by one of skill in the art in possession of the present disclosure, any connection between either of the spine switch devices 214a/214b and a leaf switch device 212a/212b may include one or more links that may be aggregated similarly as discussed above. In an embodiment, either or both of the spine switch devices 214a and 214b may be provided by the IHS 100 discussed above with reference to FIG. 1, and/or may include some or all of the components of the IHS 100. However, while illustrated and discussed as being provided by spine switch devices, one of skill in the art in possession of the present disclosure will recognize that the port configuration migration system 200 may include any devices that may be configured to operate similarly as the spine switch devices 214a and 214b discussed below.

In the illustrated embodiment, the port configuration migration system 200 also includes an Internet device 216 that is connected to the leaf switch device 212b, as well as to the Internet (not explicitly illustrated in FIG. 2). In an embodiment, the Internet device 216 may be provided by the IHS 100 discussed above with reference to FIG. 1, and/or may include some or all of the components of the IHS 100, and in specific examples may be provided by a router device. However, while illustrated and discussed as being provided by a router device, one of skill in the art in possession of the present disclosure will recognize that the port configuration migration system 200 may include any devices that may be configured to operate similarly as the Internet device 216 discussed below. However, while a specific port configuration migration system 200 has been illustrated and described, one of skill in the art in possession of the present disclosure will recognize that the port configuration migration system of the present disclosure may include a variety of components and component configurations while remaining within the scope of the present disclosure as well.

Figure 3:
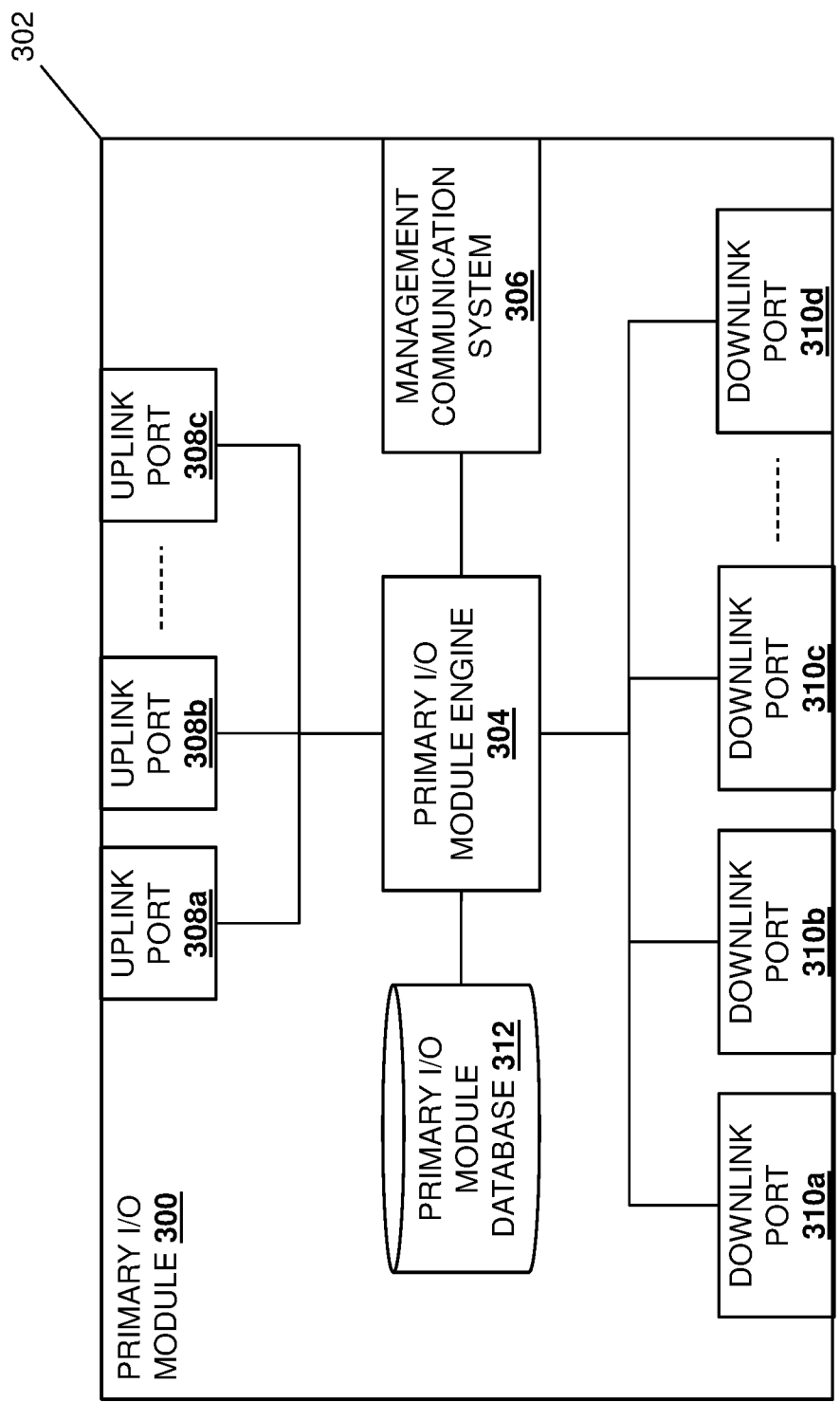
FIG. 3 is a schematic view illustrating an embodiment of a primary I/O module included in the port configuration migration system of FIG. 2.

Referring now to FIG. 3, an embodiment of a primary I/O module 300 is illustrated that may provide either or both of the primary I/O modules 204a and 204b discussed above with reference to FIG. 2. As such, the primary I/O module 300 may be provided by the IHS 100 discussed above with reference to FIG. 1 and/or may include some or all of the components of the IHS 100, and in specific examples may be provided by a DELL® EMC® networking MX9116n fabric switching engine switch device, available from DELL® Inc. of Round Rock, Tex., United States. Furthermore, while illustrated and discussed as a particular primary I/O module, one of skill in the art in possession of the present disclosure will recognize that the functionality of the primary I/O module 300 discussed below may be provided by other devices that are configured to operate similarly as the primary I/O module 300 discussed below. In the illustrated embodiment, the primary I/O module 300 includes a chassis 302 that houses the components of the primary I/O module 300, only some of which are illustrated and discussed below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a primary I/O module engine 304 that is configured to perform the functionality of the primary I/O module engines and/or primary I/O modules discussed below. As discussed below, in some examples the functionality of the primary I/O module engine 304 may include primary I/O module functionality as well as the functionality of the fabric manager engine 604 in the fabric manager system 210/600 discussed below.

The chassis 302 may also house a management communication system 306 that is coupled to the primary I/O module engine 304 (e.g., via a coupling between the management communication system 306 and the processing system), that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure, and that couples the primary I/O module 300 to the fabric manager system 210 in some of the examples provided herein. In addition, the chassis 302 may include a plurality of uplink ports 308a, 308b, and up to 308c that, as discussed below, may couple the primary I/O module to any of the leaf switch devices 212a and 212b. Furthermore, the chassis 302 may also include a plurality of downlink ports 310a, 310b, 310c, and up to 310d that, as discussed below, may couple the primary I/O module 300 to any of the secondary I/O modules 206a-206b and/or server devices 208a or 208b.

The chassis 302 may also house a storage device (not illustrated, but which may include the storage device 108 discussed above with reference to FIG. 1) that is coupled to the primary I/O module engine 304 (e.g., via a coupling between the storage device and the processing system) and that may include a primary I/O module database 312 that is configured to store any of the information utilized by the primary I/O module engine 304 discussed below. However, while a specific primary I/O module 300 has been illustrated, one of skill in the art in possession of the present disclosure will recognize that primary I/O modules (or other devices operating according to the teachings of the present disclosure in a manner similar to that described below for the primary I/O module 300) may include a variety of components and/or component configurations for providing conventional primary I/O module functionality, as well as the functionality discussed below, while remaining within the scope of the present disclosure as well.

Figure 4:
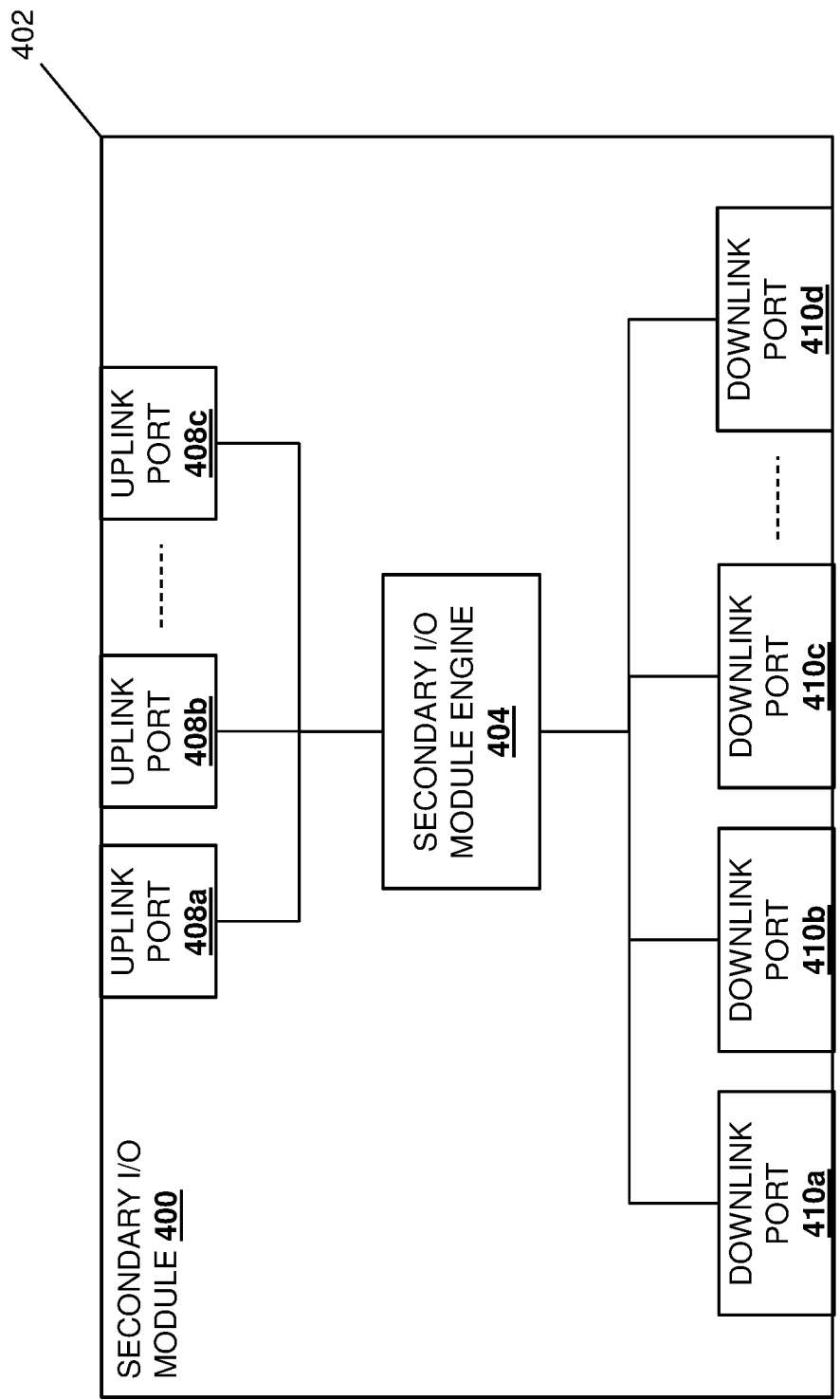
FIG. 4 is a schematic view illustrating an embodiment of a secondary I/O module included in the port configuration migration system of FIG. 2.

Referring now to FIG. 4, an embodiment of a secondary I/O module 400 is illustrated that may provide any or all of the secondary I/O modules 206a-206b discussed above with reference to FIG. 2. As such, the secondary I/O module 400 may be provided by the IHS 100 discussed above with reference to FIG. 1 and/or may include some or all of the components of the IHS 100, and in specific examples may be provided by a DELL® MX7108 expander module, available from DELL® Inc. of Round Rock, Tex., United States. Furthermore, while illustrated and discussed as a particular secondary I/O module, one of skill in the art in possession of the present disclosure will recognize that the functionality of the secondary I/O module 400 discussed below may be provided by other devices that are configured to operate similarly as the secondary I/O module 400 discussed below. In the illustrated embodiment, the secondary I/O module 400 includes a chassis 402 that houses the components of the secondary I/O module 400, only some of which are illustrated and discussed below. For example, the chassis 402 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a secondary I/O module engine 404 that is configured to perform the functionality of the secondary I/O module engines and/or secondary I/O modules discussed below.

The chassis 402 may include a plurality of uplink ports 408a, 408b, and up to 408c that, as discussed below, may couple the secondary I/O module 400 to any of the primary I/O modules 204a and 204b. Furthermore, the chassis 402 may also include a plurality of downlink ports 410a, 410b, 410c, and up to 410d that, as discussed below, may couple the secondary I/O module 400 to any of the server devices 208b and 208c. However, while a specific secondary I/O module 400 has been illustrated, one of skill in the art in possession of the present disclosure will recognize that secondary I/O modules (or other devices operating according to the teachings of the present disclosure in a manner similar to that described below for the secondary I/O module 400) may include a variety of components and/or component configurations for providing conventional secondary I/O module functionality, as well as the functionality discussed below, while remaining within the scope of the present disclosure as well.

Figure 5:
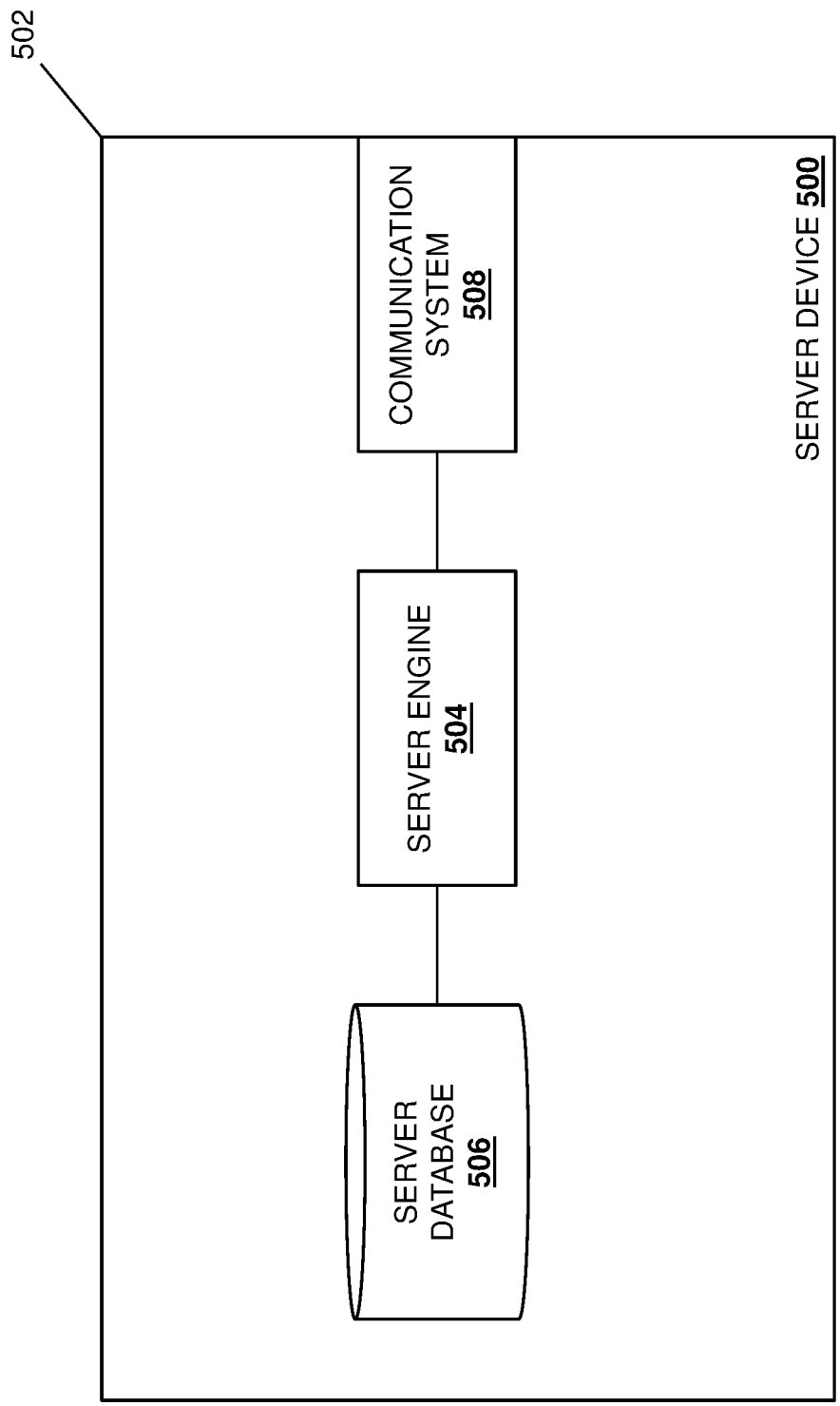
FIG. 5 is a schematic view illustrating an embodiment of a server device included in port configuration migration system of FIG. 2.

Referring now to FIG. 5, an embodiment of a server device 500 is illustrated that may provide any or all of the server devices 208a-208d discussed above with reference to FIG. 2. As such, the server device 500 may be provided by the IHS 100 discussed above with reference to FIG. 1 and/or may include some or all of the components of the IHS 100. Furthermore, while illustrated and discussed as being provided by a server device, one of skill in the art in possession of the present disclosure will recognize that the functionality of the server device 500 discussed below may be provided by other devices that are configured to operate similarly as the server device 500 discussed below. In the illustrated embodiment, the server device 500 includes a chassis 502 that houses the components of the server device 500, only some of which are illustrated below. For example, the chassis 502 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a server engine 504 that is configured to perform the functionality of the server engines and/or server devices discussed below.

The chassis 502 may also house a storage device (not illustrated, but which may include the storage device 108 discussed above with reference to FIG. 1) that is coupled to the server engine 504 (e.g., via a coupling between the storage device and the processing system) and that provides a server 506 that may store any of the information utilized by the server engine 504 discussed below. The chassis 502 may also house a communication system 508 that is coupled to the server engine 504 (e.g., via a coupling between the communication system 508 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. However, while a server device 500 has been illustrated, one of skill in the art in possession of the present disclosure will recognize that server device (or other devices operating according to the teachings of the present disclosure in a manner similar to that described below for the server device 500) may include a variety of components and/or component configurations for providing conventional server device functionality, as well as the functionality discussed below, while remaining within the scope of the present disclosure as well.

Figure 6:
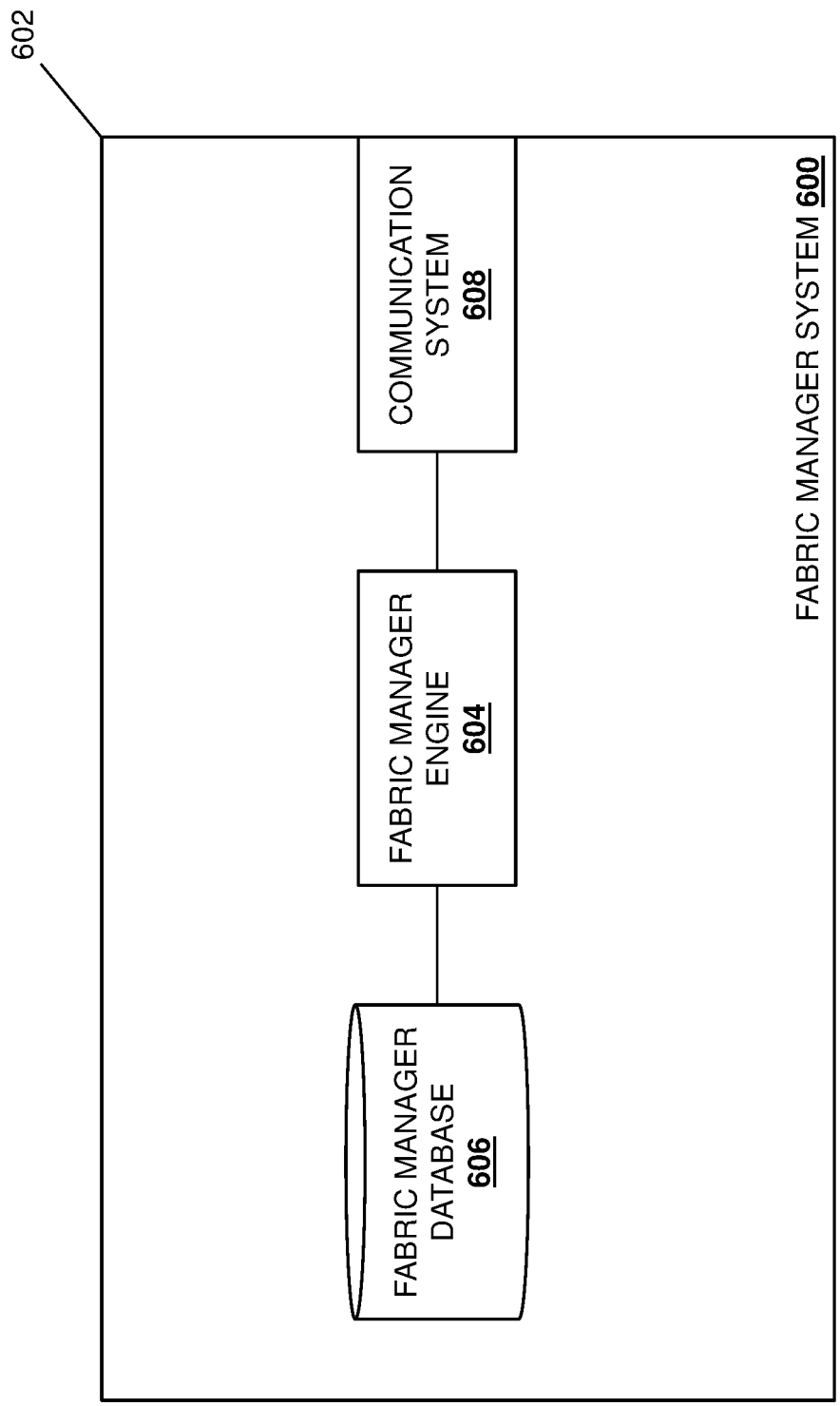
FIG. 6 is a schematic view illustrating an embodiment of a fabric manager system included in port configuration migration system of FIG. 2.

Referring now to FIG. 6, an embodiment of a fabric manager system 600 is illustrated that may provide the fabric manager system 210 discussed above with reference to FIG. 2. As such, the fabric manager system 600 may be provided by the IHS 100 discussed above with reference to FIG. 1 and/or may include some or all of the components of the IHS 100, and in specific example may be provided by an SFS fabric manager system. Furthermore, while illustrated and discussed as being provided by a particular fabric manager system, one of skill in the art in possession of the present disclosure will recognize that the functionality of the fabric manager system 600 discussed below may be provided by other devices that are configured to operate similarly as the fabric manager system 600 discussed below. In the illustrated embodiment, the fabric manager system 600 includes a chassis 602 that houses the components of the fabric manager system 600, only some of which are illustrated below. For example, the chassis 602 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a fabric manager engine 604 that is configured to perform the functionality of the fabric manager engines and/or fabric manager systems discussed below. As discussed above, in some examples, the functionality of the fabric manager engine 604 may be provided by the primary I/O module engine 304 in a primary I/O modules 204a/300 or 204b/300 while remaining within the scope of the present disclosure as well.

The chassis 602 may also house a storage device (not illustrated, but which may include the storage device 108 discussed above with reference to FIG. 1) that is coupled to the fabric manager engine 604 (e.g., via a coupling between the storage device and the processing system) and that provides a fabric manager database 606 that may store any of the information utilized by the fabric manager engine 604 discussed below. The chassis 602 may also house a communication system 608 that is coupled to the fabric manager engine 604 (e.g., via a coupling between the communication system 608 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. However, while a specific fabric manager system 600 has been illustrated, one of skill in the art in possession of the present disclosure will recognize that fabric manager systems (or other devices operating according to the teachings of the present disclosure in a manner similar to that described below for the fabric manager system) may include a variety of components and/or component configurations for providing conventional fabric manager functionality, as well as the functionality discussed below, while remaining within the scope of the present disclosure as well.

Figure 7:
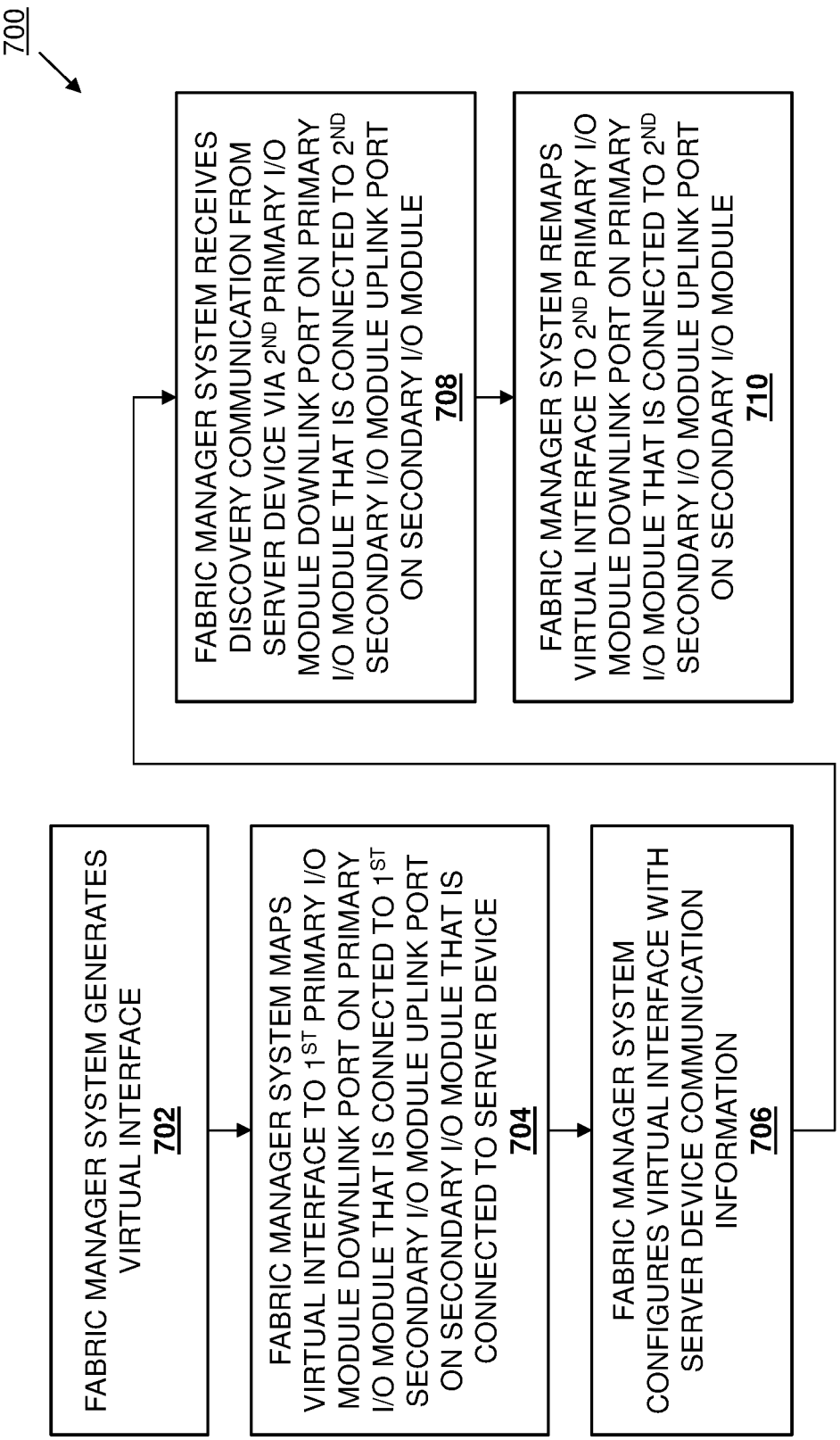
FIG. 7 is a flow chart illustrating an embodiment of a method for migrating port configurations.

Referring now to FIG. 7, an embodiment of a method 700 for migrating port configurations is illustrated. As discussed below, the systems and methods of the present disclosure provide for the automatic migration of port configurations when connections between a secondary I/O module and a primary I/O module change. For example, a secondary I/O module may include a secondary I/O module downlink port that is connected to a server device, as well as first and second secondary I/O module uplink ports that are connected to respective first and second primary I/O module downlink ports on a primary I/O module. A fabric manager system that is coupled to the primary I/O module may operate to map a virtual interface to the first primary I/O module downlink port on the primary I/O module, with the virtual interface providing a virtual direct connection of the virtual interface to the server device, and may then configure the virtual interface with server device communication configuration information for the server device such that data communications received via the first primary I/O module downlink port are transmitted using the virtual interface configured with the server device communication configuration information for the server device. When the fabric manager system receives a discovery communication from the server device via the second primary I/O module downlink port on the primary I/O module (e.g., due to a connection change between the secondary I/O module and the primary I/O module), it remaps the virtual interface to the second primary I/O module downlink port such that data communications received via the second primary I/O module downlink port are transmitted using the virtual interface configured with the server device communication configuration information for the server device. As such, the manual reconfiguration of primary I/O modules in response to connection changes between those primary I/O modules and secondary I/O modules is eliminated, thus eliminating the system downtime associated with such reconfigurations.

Figure 8A:
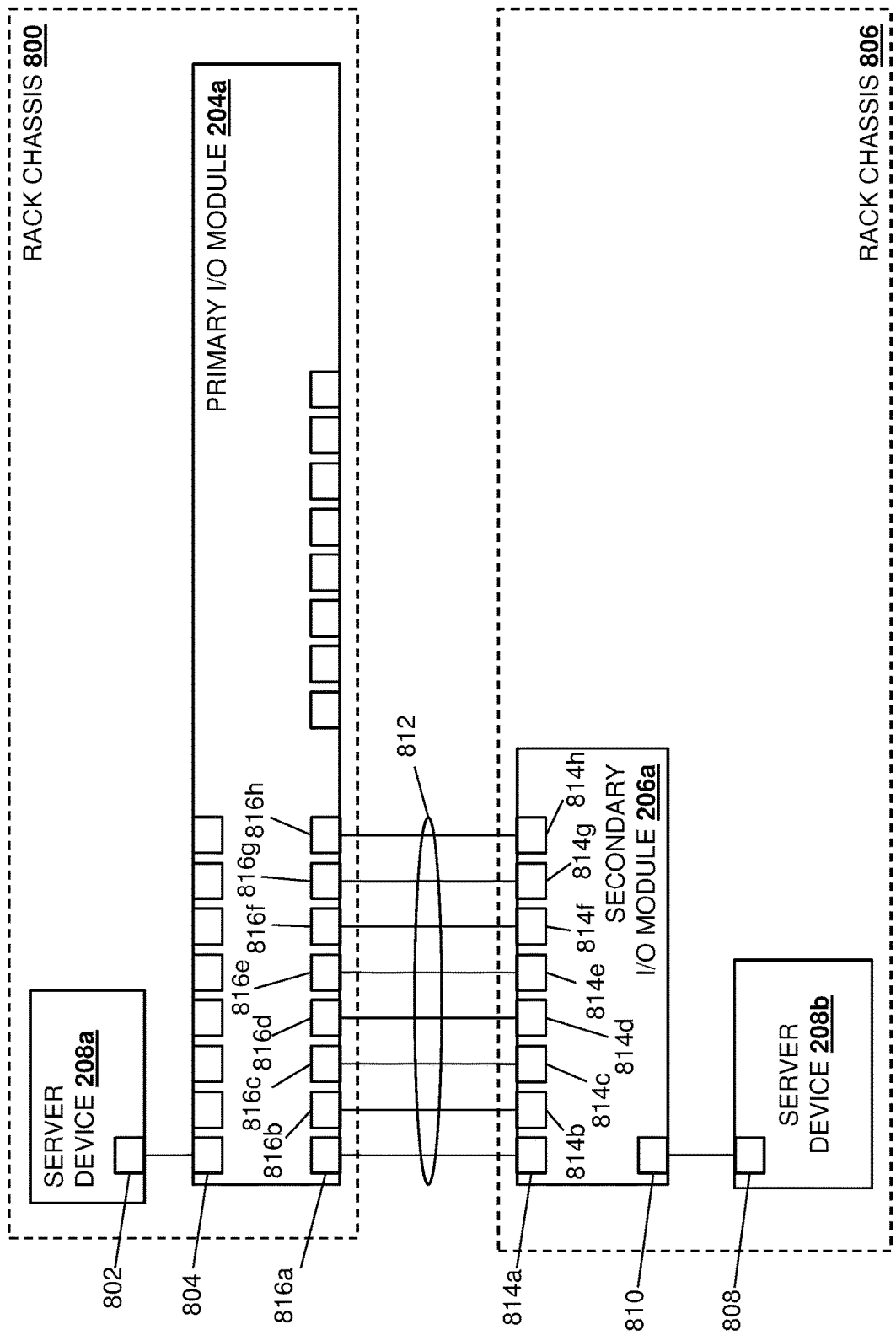
FIG. 8A is a schematic view illustrating an embodiment of the port configuration migration system of FIG. 2 in a first configuration.

With reference to FIG. 8A, an example of specific connections of the primary I/O module 204a, the secondary I/O module 206a, and the server devices 208a and 208b is illustrated for purposes of the discussion provided below. As illustrated, the primary I/O module 204a may be included in a rack chassis 800 that also houses the server device 208a, with the server device 208a directly connected to that primary I/O module 204a via, for example, a cable connected to each of an uplink port 802 on the server device 208a and a downlink port 804 on the primary I/O module 204a. Furthermore, a rack chassis 806 may house the secondary I/O module 206a and the server device 208b, with the server device 208b directly connected to that secondary I/O module 206a via, for example, a cable connected to each of an uplink port 808 on the server device 208b and a downlink port 810 on the secondary I/O module 206a.

As illustrated, the secondary I/O module 206a may be connected to the primary I/O module 204a via a coupling 812 between downlink ports 814a-814h on the primary I/O module 204a and uplink ports 816a-816h on the secondary I/O module 206a (e.g., using a "double density" coupling or other high bandwidth coupling known in the art). For example, each link between the downlink ports 814a-814h and uplink ports 816a-816h (e.g., the link between downlink port 814a and uplink port 816a, the link between downlink port 814b and uplink port 816b, etc.) may be a 25 G portion of a 200 G link provided by the coupling 812. However, while a specific coupling between the primary I/O module 204a and secondary I/O module 206a is illustrated and described, one of skill in the art in possession of the present disclosure will appreciate that other primary/secondary I/O module couplings will fall within the scope of the present disclosure as well.

The method 700 begins at block 702 where a fabric manger system generates a virtual interface. In an embodiment, at block 702 and following the physical configuration of the port configuration migration system 200 (e.g., to provide the physical connections illustrated in FIG. 8A), and the powering on, resetting, and/or other initialization of that port configuration migration system 200, the fabric manager engine 604 in the fabric manager system 210/600 may operate to generate a virtual interface. In one specific example, the fabric manager engine 604 in the fabric manager system 210/600 may operate to perform discovery operations described in U.S. patent application Ser. No. 16/526,624, filed on Jul. 30, 2019, the disclosure of which is incorporated herein by reference. Similarly as discussed in that application, and with reference to FIG. 8A, following the initialization of the port configuration migration system 200, enclosure controllers (not illustrated) in the rack chassis 800 and 806 may provide the server devices 208a and 208b a variety of information including, for example, a rack chassis identity of the rack chassis in which that server device is located, a slot identity of the slot in the rack chassis in which that server device is located, an I/O module identity and I/O module type of the I/O module to which that server device is connected, port identities of the port(s) on that server device that are connected to the I/O module, and/or other information that would be apparent to one of skill in the art in possession of the present disclosure.

In response to receiving the information from the enclosure controller discussed above, the server engine 504 in the server device 500 may generate a discovery communication (e.g., a Link Layer Discovery Protocol (LLDP) communication) including any or all of the information received from the enclosure controller in its rack chassis, and may transmit those discovery communications to their connected I/O module. As such, the server device 208a/500 may transmit a discovery communication via its communication system 508 to the primary I/O module engine 304 in the primary I/O module 204a/300, with that discovery communication identifying itself, the rack chassis identity of the rack chassis 800 in which the server device 208a is located, a slot identity of the slot in the rack chassis 800 in which the server device 208a is located, an I/O module identity and I/O module type of the primary I/O module 204a to which the server device 208a is connected, a port identity of the port 802 on the server device 208a that is connected to the primary I/O module 204a, and/or other information that would be apparent to one of skill in the art in possession of the present disclosure. As will be appreciated by one of skill in the art in possession of the present disclosure, the port configuration migration functionality of the present disclosure may not be utilized with server devices that are directly connected to primary I/O modules, and thus the information provided by the server device 208a to the primary I/O module 204a may not be utilized during the method 700.

Similarly as discussed above, the server device 208b may transmit a discovery communication via its communication system 508 and via the secondary I/O module 206a to the primary I/O module engine 304 in the primary I/O module 204a/300 via the downlink port 816a in the examples below, with that discovery communication identifying itself, the rack chassis identity of the rack chassis 806 in which the server device 208b is located, a slot identity of the slot in the rack chassis 806 in which the server device 208b is located, an I/O module identity and I/O module type of the secondary I/O module 204b to which the server device 208a is connected, a port identity of the port 808 on the server device 208b that is connected to the secondary I/O module 206a, and/or other information that would be apparent to one of skill in the art in possession of the present disclosure. In response to receiving the discovery communication from the server device 208b via its downlink port 816a, the primary I/O module engine 304 may use the information in that discovery communication to identify that the server device 208b is connected to the downlink port 816a on the primary I/O module 204a via the secondary I/O module 206a and, in response, provide that discovery communication to the fabric manager engine 604 in the fabric manager system 210/600. Furthermore, as will be appreciated by one of skill in the art in possession of the present disclosure, any primary I/O module in the port configuration migration system of the present disclosure may forward to the fabric manager system any discovery communications received from server devices that are connected to those primary I/O modules via a secondary I/O module.

In response to receiving the discovery communication from the primary I/O module 204a, the fabric manger engine 604 in the fabric manager system 210/600 may use the information in that discovery communication to identify that the server device 208b is connected to the downlink port 816a on the primary I/O module 204a via the secondary I/O module 206a, and that the downlink port 816a is part of a first port group in the primary I/O module 204a that includes the downlink ports 816a-816h. As will be appreciated by one of skill in the art in possession of the present disclosure, the above discovery operations may be performed for any server devices in the port configuration migration system 200 in order to, for example, identify the server devices 208b and 208c that are connected to the primary I/O modules 204a and 204b via the secondary I/O modules 206a and 206b in FIG. 2. However, while specific discovery operations have been described, one of skill in the art in possession of the present disclosure will appreciate that server devices connected to primary I/O modules via secondary I/O modules may be identified in a variety of manners that will fall within the scope of the present disclosure as well.

In an embodiment of block 702, the fabric manager engine 604 in the fabric manager system 600 may operate to inform a network administrator or other user of the secondary I/O modules that couple server devices to port groups in primary I/O modules. For example, with reference to FIG. 8A, at block 702 the fabric manager engine 604 in the fabric manager system 600 may inform a network administrator or other user of the secondary I/O module 206a that couples the server device 208b to the port 816a in the first port group in the primary I/O module 204a that includes the ports 816a-816h. Furthermore, at block 702, the fabric manager engine 604 in the fabric manager system 600 may then request that the network administrator or other user select a virtual slot identifier identifying a virtual slot for each identified secondary I/O module, and in response to receiving a virtual slot identifier, may assign that virtual slot identifier to that secondary I/O module. As such, at block 702, the secondary I/O module 206a may be assigned a virtual slot identifier (e.g., virtual slot identifier "80" in the examples below). As will be appreciated by one of skill in the art in possession of the present disclosure, the assignment of virtual slot identifiers to secondary I/O modules may include associating a secondary I/O module identifier (e.g., a "service tag" or other unique identifier) with that virtual slot identifier in the fabric manager database 606, which allows the assignment of that virtual slot identifier to that secondary I/O module to remain persistent until the network administrator or other user removes or otherwise changes that assignment.

In an embodiment of block 702, the fabric manager engine 604 in the fabric manager system 600 may then generate a virtual interface for each downlink port in a port group on a primary I/O module that is connected to a secondary I/O module. For example, at block 702 the fabric manager engine 604 in the fabric manager system 600 may then generate a virtual interface for each downlink port 816a-816h in the first port group on the primary I/O module 204a that is connected to the secondary I/O module 206a (e.g., a virtual interface "1" for the downlink port 816a in the first port group on the primary I/O module 204a, a virtual interface "2" for the downlink port 816b in the first port group on the primary I/O module 204a, and up to a virtual interface "8" for the downlink port 816h in the first port group on the primary I/O module 204a.) However, while a specific technique for generating virtual interface for downlink ports in a port group on a primary I/O module that is connected to a secondary I/O module has been described, one of skill in the art in possession of the present disclosure will recognize that the virtual interfaces discussed above may be generated in a variety of manners that will fall within the scope of the present disclosure as well.

The method 700 then proceeds to block 704 where the fabric manger system maps the virtual interface to a first primary I/O module downlink port on a primary I/O module that is connected to a first secondary I/O module uplink port on a secondary I/O module that is connected to a server device. In an embodiment, at block 704, the fabric manager engine 604 in the fabric manager system 600 may operate to map the virtual interfaces generated at block 702 to the downlink ports on the primary I/O module that are connected to secondary I/O module uplink ports on the secondary I/O module that is connected to the server device. For example, with reference to FIG. 8A, at block 704, the fabric manager engine 604 in the fabric manager system 600 may operate to map the virtual interface "1" generated for the downlink port 816a on the primary I/O module 204a to that downlink port 816a that is connected to the uplink port 814a on the secondary I/O module 206a, with that secondary I/O module 206a connected to the server device 208b.

In one specific example, the mapping of the virtual interface to the downlink port 816a on the primary I/O module 204a may identify the virtual interface (e.g., "1"), the virtual slot identifier for the virtual slot assigned to the secondary I/O module 206a (e.g., "80"), and the uplink port 814a (e.g., "1") on the secondary I/O module 206a that is connected to the downlink port 816a on the primary I/O module 204a, which provides a virtual interface "1/80/1" that provides a virtual direct connection to the server device 208b such that the server device 208b appears to be directly connected to that virtual interface "1/80/1" from the point of view of a user viewing connections to the primary I/O module 204a (i.e., rather than via the secondary I/O module 206a.) As such, one of skill in the art in possession of the present disclosure will appreciate that a network administrator or other user of the primary I/O module may use a Command Link Interface (CLI) to view the direct connection of the server device 208a to the downlink port 804 on the primary I/O module 204a, as well as to view the virtual direct connection of the server device 208b to the virtual interface "1/80/1" provided for the primary I/O module 204a.

Similarly, a virtual interface "2/80/2" may be mapped to the downlink port 816b in the first port group on the primary I/O module 204a that is connected to the uplink port 814b on the secondary I/O module 206a, a virtual interface "3/80/3" may be mapped to the downlink port 816c in the first port group on the primary I/O module 204a that is connected to the uplink port 814c on the secondary I/O module 206a, and up to a virtual interface "8/80/8" may be mapped to the downlink port 816h in the first port group on the primary I/O module 204a that is connected to the uplink port 814h on the secondary I/O module 206a. However, while a specific example of virtual interface/primary I/O module downlink port mapping has been described, one of skill in the art in possession of the present disclosure will appreciate that the virtual interfaces of the present disclosure may be mapped to physical downlink ports on the primary I/O module that are connected to secondary I/O modules in a variety of manners that will fall within the scope of the present disclosure as well.

The method 700 then proceeds to block 706 where the fabric manger system configures the virtual interface with server device communication information. In an embodiment, at block 706, the fabric manager engine 604 in the fabric manager system 600 may request the network administrator or other user to provide server device communication information for each of the virtual interfaces that are coupled via the secondary I/O modules to server devices. For example, at block 706 the fabric manager engine 604 in the fabric manager system 600 may request the network administrator or other user to provide server device communication information for the virtual interface "1/80/1" that provides the virtual direct connection to the server device 208b. As will be appreciate by one of skill in the art in possession of the present disclosure, the server device 208b may utilize a Virtual Local Area Network (VLAN), Internet Protocol (IP) information, and/or other information for communications via the primary I/O module 204a and, as such, may require VLAN configuration information for that VLAN, IP configuration information, and/or other information to be used to configure ports through which those communications will be transmitted. As such, at block 706 the fabric manager engine 604 in the fabric manager system 600 may request the network administrator or other user to provide that VLAN configuration information, IP information, and/or other information for the virtual interface "1/80/1" that provides the virtual direct connection to the server device 208b and, upon receiving that VLAN configuration information, IP information, and/or other information, may configure the virtual interface "1/80/1" with that VLAN configuration information, IP information, and/or other information. However, while specific server device communication information has been described, one of skill in the art in possession of the present disclosure will appreciate that any of a variety of server device communication information that allows for the transmission of communications from a server device may be utilized to configure the virtual interfaces at block 706 while remaining within the scope of the present disclosure as well.

As will be appreciated by one of skill in the art in possession of the present disclosure, following the mapping of the virtual interfaces to the downlink ports on a primary I/O module to provide respective virtual direct connections to respective server devices, and then the configuration of those virtual interfaces with server device communication information for those server devices, the primary I/O modules may transmit communications received from those servers devices using those virtual interfaces that were configured with the server device communication information. For example, the primary I/O module engine 304 in the primary I/O module 204a/300 may receive communications generated by the server device 208b and transmitted via the secondary I/O module 206a (e.g., through the downlink port 816a on the primary I/O module 204a/300 from the uplink port 814a on the secondary I/O module 206a) and, due to the mapping of the virtual interface "1/80/1" to the downlink port 816a on the primary I/O module 204a/300, will operate to transmit those communications using virtual interface "1/80/1" that was configured with the server device communication information for the server device 208b (e.g., VLAN information for the VLAN that the server device 208b is configure to use, IP information used by the server device 208b, etc.). As such, as long as the coupling between the primary I/O module and secondary I/O module of the present disclosure remains (e.g., the coupling 812 between the primary I/O module 204a and the secondary I/O module 206a), one of skill in the art in possession of the present disclosure will appreciate that the primary I/O module may transmit communications received from any server device connected to the primary I/O module via the secondary I/O module using the virtual interface that was configured with the server device communication information for that server device and that was mapped to the downlink port on the primary I/O module through which those communications will be received.

Figure 8B:
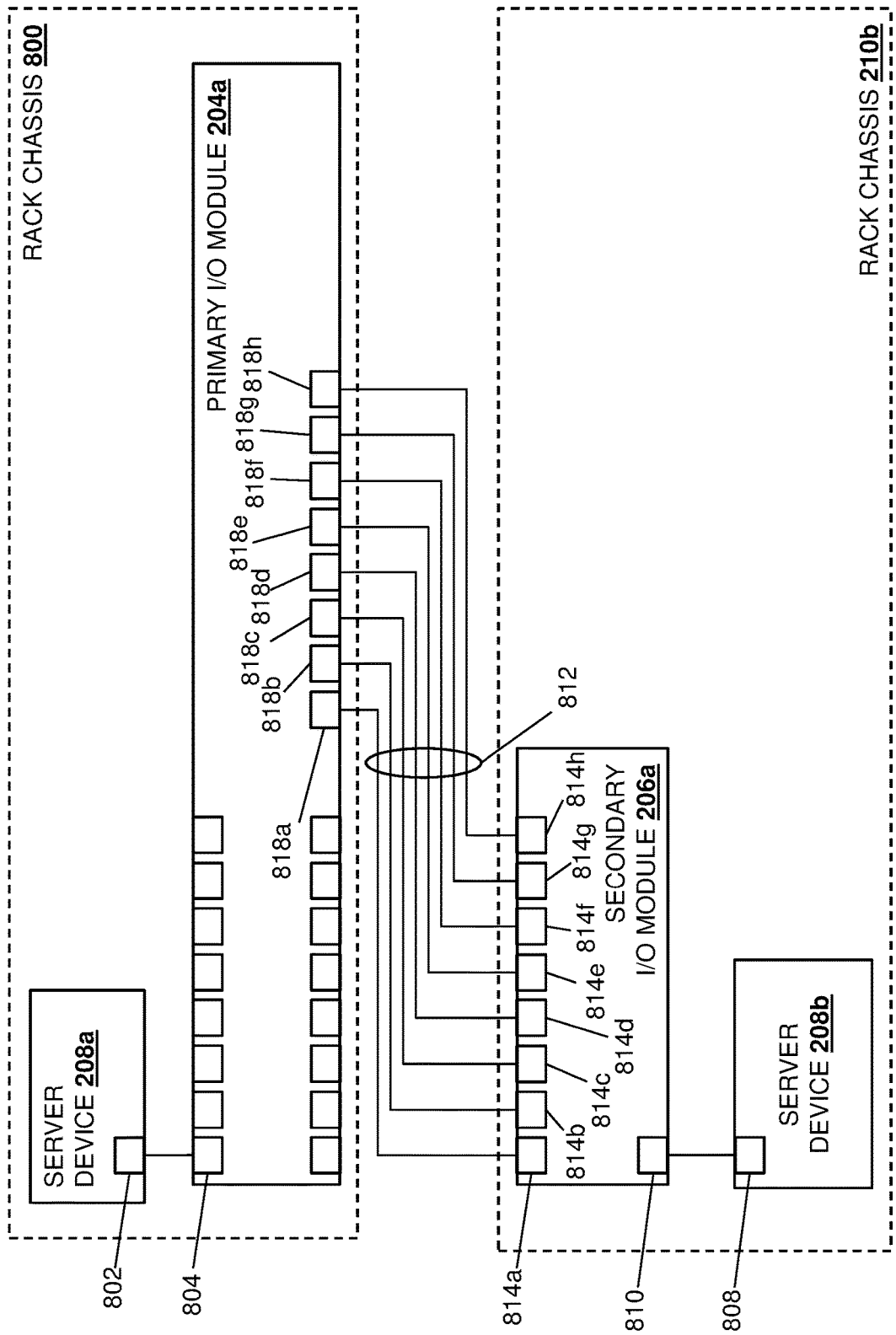
FIG. 8B is a schematic view illustrating an embodiment of the port configuration migration system of FIG. 2 in a second configuration.

The method 700 then proceeds to block 708 where the fabric manger system receives discovery communications from the server device via a second primary I/O module downlink port on the primary I/O module that is connected to a second secondary I/O module uplink port on the secondary I/O module. In an embodiment, at block 708, the coupling between a primary I/O module and a secondary I/O module may change. For example, as illustrated in FIG. 8B, the coupling 812 may be disconnected from the first port group on the primary I/O module 204a that includes downlink ports 816a-816h, and may be reconnected to a second port group on the primary I/O module 204a that includes downlink ports 818a-818h. As will be appreciated by one of skill in the art in possession of the present disclosure, a network administrator or other user may change a cabled connection (e.g., the coupling 812) of a secondary I/O module to a primary I/O module for any of a variety of reasons, and thus the disconnection of the coupling 812 from the first port group on the primary I/O module 204a that includes downlink ports 816a-816h and its reconnection to a second port group on the primary I/O module 204a that includes the downlink ports 818a-818h may be performed for any of those reasons while remaining within the scope of the present disclosure as well. However, while the secondary I/O module is illustrated as being coupled to different port groups on the same primary I/O module, one of skill in the art in possession of the present disclosure will appreciate that the teachings of the present disclosure allow a secondary I/O module to be disconnected from a first primary I/O module (e.g., the primary I/O module 204a) and connected to a second primary I/O module (e.g., the primary I/O module 204b) while providing the port configuration migration functionality of the present disclosure as well.

In one specific example, following the connection of the coupling 812 to the second port group on the primary I/O module 204a that includes downlink ports 818a-818, the fabric manager engine 604 in the fabric manager system 210/600 may operate to perform the discovery operations discussed above and described in U.S. patent application Ser. No. 16/526,624, filed on Jul. 30, 2019, the disclosure of which is incorporated herein by reference. As such, similarly as discussed above, following the connection of the coupling 812 to the second port group on the primary I/O module 204a that includes downlink ports 818a-818, the server device 208b may communicate with an enclosure controller in the rack chassis 210b and, in response, provide discovery communications (e.g., via LLDP communications) via the downlink port 818a on the primary I/O module 204a that may identify itself, the rack chassis identity of the rack chassis 806 in which the server device 208b is located, a slot identity of the slot in the rack chassis 806 in which the server device 208b is located, an I/O module identity and I/O module type of the secondary I/O module 204b to which the server device 208a is connected, a port identity of the port 808 on the server device 208b that is connected to the secondary I/O module 206a, and/or other information that would be apparent to one of skill in the art in possession of the present disclosure. In response to receiving the discovery communication via its downlink port 818a, the primary I/O module engine 304 in the primary I/O module 204a/300 will recognize that the server device 208b is connected to the primary I/O module 204a via the secondary I/O module 206a and, in response, forward those discovery communications to the fabric manger system 210/600.

The method 700 then proceeds to block 710 where the fabric manger system remaps the virtual interface to the second primary I/O module downlink port on the primary I/O module that is connected to the second secondary I/O module uplink port on the secondary I/O module. In an embodiment, at block 710 and in response to receiving the discovery communication, the fabric manager engine 604 in the fabric manager system 210/600 may identify that the server device 208b is coupled to the downlink port 818a on the primary I/O module 204a via the secondary I/O module 206a. The fabric manager engine 604 in the fabric manager system 210/600 may then determine that the virtual interface "1/80/1" provides a virtual direct connection for the server device 208b to the downlink port 816a on the primary I/O module 204a that was previously connected to the secondary I/O module 206a via its first port group that includes the downlink ports 816a-816h, and that the receiving of the discovery communication from the server device 208b via the downlink port 818a indicates that the secondary I/O module 206a is now connected to the second port group on the primary I/O module 204a that includes the downlink ports 818a-818h.

In response to determining that the connection between the primary I/O module 204a and the secondary I/O module 206a has changed, the fabric manager engine 604 in the fabric manager system 210/600 may operate to remap the virtual interfaces "1/80/1", "2/80/2", and up to "8/80/8" (which were previously mapped to the downlink ports 816a, 816b, and up to 816h, respectively, on the primary I/O module 204a) to the downlink ports 818a, 818b, and up to 818h, respectively, on the primary I/O module 204a. As will be appreciated by one of skill in the art in possession of the present disclosure, the remapping of the virtual interfaces "1/80/1", "2/80/2", and up to "8/80/8" to the downlink ports 818a, 818b, and up to 818h, respectively, on the primary I/O module 204a retains the configuration of those virtual interfaces "1/80/1", "2/80/2", and up to "8/80/8" that was performed using the server device communication information (e.g., VLAN information, IP information, etc.). As such, the remapping of the virtual interface "1/80/1" from the downlink port 816a to the downlink port 818a on the primary I/O module 204a will allow communications received from the server device 208b via the downlink port 818a that is mapped to the virtual interface "1/80/1" to be transmitted using the configuration that was previously applied to that virtual interface "1/80/1".

As will be appreciated by one of skill in the art in possession of the present disclosure, following the remapping of the virtual interfaces to new downlink ports on a primary I/O module, the primary I/O modules may transmit communications received from those server devices using the virtual interfaces configured with the server device communication information. For example, the primary I/O module engine 304 in the primary I/O module 204a/300 may receive communications generated by the server device 208b and transmitted via the secondary I/O module 206a (i.e., to the downlink port 818a on the primary I/O module 204a/300 from the uplink port 814a on the secondary I/O module 206a) and, due to the remapping of the virtual interface "1/80/1" to the downlink port 818a on the primary I/O module 204a/300, will operate to transmit those communications using virtual interface "1/80/1" that was configured with the server device communication information for the server device 208b (e.g., VLAN information for the VLAN that the server device 208b is configure to use, IP information for the server device 208b, etc.). As such, when the coupling between the primary I/O module and secondary I/O module of the present disclosure changes (e.g., the coupling 812 is moved between port groups on the primary I/O module 204a), the virtual interfaces may be remapped from the previously connected downlink ports on the primary I/O module to the newly connected downlink ports on the primary I/O module such that the primary I/O module may transmit communications received from any server device connected to the primary I/O module via the secondary I/O module using the virtual interface that was configured using the server device communication information for that server device and remapped to the newly connected downlink ports upon which those communications are received. As discussed above, while the virtual interfaces are described as being remapped between downlink ports on the same primary I/O module, one of skill in the art in possession of the present disclosure will recognize that the virtual interfaces of the present disclosure may be remapped between downlink ports on different primary I/O modules while remaining within the scope of the present disclosure as well.

Thus, systems and methods have been described that provide for the automatic migration of port configurations when connections between a secondary I/O module and a primary I/O module change. For example, a secondary I/O module may include a secondary I/O module downlink port that is connected to the server device, as well as first and second secondary I/O module uplink ports that are connected to respective first and second primary I/O module downlink ports on a primary I/O module. A fabric manager system that is coupled to the primary I/O module may operate to map a virtual interface to the first primary I/O module downlink port on the primary I/O module, with the virtual interface providing a virtual direct connection of the virtual interface to the server device, and may then configure the virtual interface with server device communication configuration information for the server device such that data communications received via the first primary I/O module downlink port are transmitted using the virtual interface configured with the server device communication configuration information for the server device. When the fabric manager system receives a discovery communication from the server device via the second primary I/O module downlink port on the primary I/O module due to a connection change between the secondary I/O module and the primary I/O module, it remaps the virtual interface to the second primary I/O module downlink port such that data communications received via the second primary I/O module downlink port are transmitted using the virtual interface configured with the server device communication configuration information for the server device. As such, the manual reconfiguration of primary I/O modules in response to connection changes between those primary I/O modules and secondary I/O modules is eliminated, thus eliminating the system downtime associated with such reconfigurations.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A communication interface configuration migration system, comprising:
   a computing device;
   a second networking device that is connected to the computing device;
   a first networking device that is connected to the second networking device; and
   a management system that is coupled to the first networking device and that is configured to:
      map a virtual interface to a first communication interface on the first networking device with the second networking device, wherein the virtual interface provides a virtual direct connection to the computing device;
      configure the virtual interface with computing device communication configuration information for the computing device such that data communications received via the first communication interface are transmitted using the virtual interface;
      receive, via a second communication interface on the first networking device with the second networking device, a discovery communication from the computing device; and
      remap, based on the receiving of the discovery communication from the computing device via the second communication interface, the virtual interface to the second communication interface such that data communications received via the second communication interface are transmitted using the virtual interface.

2. The system of claim 1, wherein the management system is configured to:
   identify the second networking device;
   associate a virtual slot identifier with the second networking device; and
   generate the virtual interface based on the virtual slot identifier and a port on the second networking device that is connected to the first communication interface on the first networking device.

3. The system of claim 2, wherein the management system is configured to:
   provide, in response to identifying the second networking device, a virtual slot identifier selection request; and
   receive, in response to the virtual slot identifier selection request, the virtual slot identifier.

4. The system of claim 1, wherein the computing device communication configuration information for the computing device includes virtual network information for a virtual network that the computing device is configured to use.

5. The system of claim 1, wherein the discovery communication is a Link Layer Discovery Protocol (LLDP) communication.

6. The system of claim 1, wherein the remapping the virtual interface to the second communication interface on the primary network device based on the receiving of the discovery communication from the computing device via the second communication interface includes, in response to receiving the discovery communication from the computing device via the second communication interface:
   identifying the computing device;
   identifying the second networking device that is connected to the computing device; and
   determining that the discovery communication was received from the computing device via the second communication interface rather than the first communication interface to which the virtual interface was mapped and, in response, remapping the virtual interface to the second communication interface.

7. An Information Handling System (IHS), comprising:
   a processing system; and
   a memory system that is coupled to the processing system and that includes instructions that, when executed by the processing system, cause the processing system to provide a management engine that is configured to:
      map a virtual interface to a first communication interface on a first networking device with a second networking device, wherein the virtual interface provides a virtual direct connection to a computing device that is coupled to the second networking device;
      configure the virtual interface with computing device communication configuration information for the computing device such that data communications received via the first communication interface are transmitted using the virtual interface;
      receive, via a second communication interface on the first networking device with the second networking device, a discovery communication from the computing device; and
      remap, based on the receiving of the discovery communication from the computing device via the second communication interface, the virtual interface to the second communication interface such that data communications received via the second communication interface are transmitted using the virtual interface.

8. The IHS of claim 7, wherein the management engine is configured to:
   identify the second networking device;
   associate a virtual slot identifier with the second networking device; and
   generate the virtual interface based on the virtual slot identifier and a port on the second networking device that is connected to the first communication interface on the first networking device.

9. The IHS of claim 8, wherein the management engine is configured to:
   provide, in response to identifying the second networking device, a virtual slot identifier selection request; and
   receive, in response to the virtual slot identifier selection request, the virtual slot identifier.

10. The IHS of claim 7, wherein the computing device communication configuration information for the computing device includes virtual network information for a virtual network that the computing device is configured to use.

11. The IHS of claim 7, wherein the discovery communication is a Link Layer Discovery Protocol (LLDP) communication.

12. The IHS of claim 7, wherein the remapping the virtual interface to the second communication interface on the first network device based on the receiving of the discovery communication from the computing device via the second communication interface includes, in response to receiving the discovery communication from the computing device via the second communication interface:
  identifying the computing device;
  identifying the second networking device that is connected to the computing device; and
  determining that the discovery communication was received from the computing device via the second communication interface rather than the first communication interface to which the virtual interface was mapped and, in response, remapping the virtual interface to the second communication interface.

13. The IHS of claim 7, wherein the management engine is configured to:
  automatically identify the first communication interface on the first networking device with the second networking device; and
  automatically identify the second communication interface on the first networking device with the second networking device.

14. A method for migrating port configurations, comprising:
  mapping, by a management system, a virtual interface to a first communication interface on a first networking device with a second networking device, wherein the virtual interface provides a virtual direct connection to a computing device;
  configuring, by the management system, the virtual interface with computing device communication configuration information for the computing device such that data communications received via the first communication interface are transmitted using the virtual interface;
  receiving, by the management system via a second communication interface on the first networking device with the second networking device, a discovery communication from the computing device; and
  remapping, by the management system based on the receiving of the discovery communication from the computing device via the second communication interface, the virtual interface to the second communication interface such that data communications received via the second communication interface are transmitted using the virtual interface.

15. The method of claim 14, further comprising:
  identifying, by the management system, the second networking device;
  associating, by the management system, a virtual slot identifier with the second networking device; and
  generating, by the management system, the virtual interface based on the virtual slot identifier and a port on the second networking device that is connected to the first communication interface on the first networking device.

16. The method of claim 15, further comprising:
  providing, by the management system in response to identifying the second networking device, a virtual slot identifier selection request; and
  receiving, by the management system in response to the virtual slot identifier selection request, the virtual slot identifier.

17. The method of claim 14, wherein the computing device communication configuration information for the computing device includes virtual network information for a virtual network that the computing device is configured to use.

18. The method of claim 14, wherein the discovery communication is a Link Layer Discovery Protocol (LLDP) communication.

19. The method of claim 14, wherein the remapping the virtual interface to the second communication interface on the primary network device based on the receiving of the discovery communication from the computing device via the second communication interface includes, in response to receiving the discovery communication from the computing device via the second communication interface:
  identifying, by the management system, the computing device;
  identifying, by the management system, the second networking device that is connected to the computing device; and
  determining, by the management system, that the discovery communication was received from the computing device via the second communication interface rather than the first communication interface to which the virtual interface was mapped and, in response, remapping the virtual interface to the second communication interface.

20. The method of claim 14, further comprising:
  automatically identifying, by the management system, the first communication interface on the first networking device with the second networking device; and
  automatically identifying, by the management system, the second communication interface on the first networking device with the second networking device.

* * * * *

UNITED STATES PATENT AND TRADEMARK OFFICE
CERTIFICATE OF CORRECTION

| | |
|---|---|
| PATENT NO. | : 11,593,287 B2 |
| APPLICATION NO. | : 17/506014 |
| DATED | : February 28, 2023 |
| INVENTOR(S) | : Singal et al. |

It is certified that error appears in the above-identified patent and that said Letters Patent is hereby corrected as shown below:

On the Title Page

Item (72) Inventors: "Joseph Lasalle White" should be changed to --Joseph LaSalle White--

Signed and Sealed this
Twenty-third Day of May, 2023

Katherine Kelly Vidal
*Director of the United States Patent and Trademark Office*